(12) United States Patent
O'Neill

(10) Patent No.: US 6,874,819 B2
(45) Date of Patent: Apr. 5, 2005

(54) SEAT BELT SENSING FOR VEHICLE OCCUPANT LOAD AND MISUSE

(75) Inventor: John O'Neill, Clarkston, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/643,891

(22) Filed: Aug. 20, 2003

(65) Prior Publication Data

US 2005/0039965 A1 Feb. 24, 2005

(51) Int. Cl.$^7$ .............................................. B60R 22/28
(52) U.S. Cl. ..................................... 280/805; 280/735
(58) Field of Search ................................ 280/805, 806, 280/735; 297/470, 471, 472; 242/379.1

(56) References Cited

U.S. PATENT DOCUMENTS

| | | |
|---|---|---|
| 3,741,494 A | 6/1973 | Fiala |
| 3,767,134 A | 10/1973 | Morales |
| 3,881,667 A | 5/1975 | Tandetzke |
| 5,547,143 A | 8/1996 | Miller, III et al. |
| 5,788,177 A * | 8/1998 | Keller et al. ............. 242/379.1 |
| 5,799,893 A * | 9/1998 | Miller et al. ............. 242/379.1 |
| 5,820,058 A | 10/1998 | Hirzel et al. |
| 5,924,641 A | 7/1999 | Keller et al. |
| 5,934,596 A | 8/1999 | Gorman et al. |
| 6,012,667 A | 1/2000 | Clancy, III et al. |
| 6,145,881 A | 11/2000 | Miller, III et al. |
| 6,311,571 B1 | 11/2001 | Norton |

* cited by examiner

Primary Examiner—Faye M. Fleming
(74) Attorney, Agent, or Firm—Lonnie Drayer

(57) ABSTRACT

A vehicle safety system uses sensors mounted between a seat belt frame and a seat belt spool to detect protraction of seat belt webbing after the seat belt spool has been locked by an inertial switch or the like. The vehicle safety system gathers information from vehicle mounted crash sensors. If the vehicle safety system determines that a crash is taking place, but does not receive an output from the sensor mounted between the seat belt frame and the seat belt spool indicating seat belt webbing is being protracted, the system deploys other safety apparatus based on the assumption that the occupant of a particular seat is not properly restrained by one or more seat belts. For example seat belt use information can be used to vary the level of airbag deployment in a variable deployment airbag. An alternative embodiment detects motion of a linear energy-absorbing mechanism.

6 Claims, 2 Drawing Sheets ized by the vehicle occupant. With the development of these more sophisticated vehicle safety systems it has become even more important to be able to determine whether a seat belt is fastened or not so this information can be used in the actuation of airbags and other safety devices. If a vehicle occupant refuses to wear a seat belt, it is possible to take that into account in the airbag's deployment strategy to the benefit of the unbelted vehicle occupant. Because wearing a seat belt confers such a large safety benefit to the vehicle occupant, vehicle systems are often designed to encourage seat belt use by, for example, sounding an alarm until the seat belt is fastened.

To defeat systems designed to encourage seat belt use, vehicle occupants are known to fasten seat belts behind the occupant. In the case of seat belts which must be not only fastened but protracted to turn off a seat belt alarm, occupants are known to fasten the seat belt around the back of the vehicle seat. Seat belts may also be worn only partially with the shoulder belt or the lab belt being placed behind the vehicle occupant. Seat belt sensors that monitor the tension on the seat belt are known. Seat belt tension is monitored principally in order to be able to accurately determine the seat occupant's weight. For example, the deployment of an airbag may be disabled if the seat occupant is below a selected weight based on safety system logic that the seat occupant must be a child, a package, or a child seat. For a child seat, however, the seat belt is tensioned which will press the child seat downwardly causing occupant weight sensors to reflect higher loads. By subtracting the load caused by seat belt tension as measured by a seat belt tension sensor the true weight of the seat occupant can be determined and safety system logic can operate on the basis of the true weight of the seat occupant.

During an actual crash, the loads imposed on the seat belt are quite high as the seat occupant is driven by accelerations many times the force of gravity against the restraining belts. In order to reduce the loads experienced by the vehicle occupant during a crash seat belt retractors have been designed to incorporate energy dissipation mechanisms that allow the seat belts to extend under load, thus absorbing energy.

In a conventional seat belt retractor, an inertial sensor is used to stop the rotation of a spool to prevent the protraction of the seat belt webbing during a crash. In a seat belt retractor with load limiting capabilities the seat belt retractor permits the controlled protraction of the seat belt by incorporating within the retractor an energy absorption (or dissipation) mechanism which permits the spool to rotate after the retractor has been initially locked up. In the past these mechanisms have included crushable bushings (U.S. Pat. No. 5,547,143), deformable tubes (U.S. Pat. No. 3,881,667) or torsion bars (U.S. Pats. Nos. 3,741,494 and 6,012,667 which are incorporated herein by reference). Linear operating load limiters are also known to which a seat belt is anchored or over which the seat belt webbing passes (U.S. Pat. No. 6,145,881 which is incorporated herein by reference).

Operation of a load limiting/energy-absorbing mechanism is a clear indicator that a seat belt is properly fastened about a seat occupant. What is needed is a mechanism and method for determining when a seat belt is not properly fastened about a vehicle occupant during a vehicle crash. Particularly needed is a system based on predicting the operation of the load limiting/energy-absorbing mechanism and determining when it should, but has not, operated, so the lack of a properly fastened seat belt for a vehicle occupant can be determined. Information indicating the lack of proper seat belt use can then be used as an input to the vehicle safety system which determines how best to deploy other safety system components such as airbags.

SUMMARY OF THE INVENTION

The vehicle safety system of this invention has seat belt retractors that incorporate a seat belt frame and a seat belt spool mounted for rotation on the seat belt frame. An energy-absorbing mechanism such as a torsion bar, deformable tubes, crushable bearings, or deformable threads, is positioned to connect the seat belt spool to the seat belt frame so as to absorb energy as the seat belt is protracted from the seat belt spool during a crash. A switch engages the energy-absorbing mechanism based on a level of acceleration or the rate at which the seat belt web is withdrawn from the seat belt spool, or based on the actuation of a pyrotechnic switch. A sensor is mounted between the seat belt frame and the seat belt spool and, after the switch has been activated, the sensor measures the amount of relative movement between the seat belt spool and the seat belt frame. This relative movement is communicated to a vehicle safety system which receives input from vehicle mounted crash sensors. If the vehicle safety system determines, based on the vehicle mounted crash sensors, that a crash is taking place, but does not receive an output from the sensor mounted between the seat belt frame and the seat belt spool indicating a seat belt web is being protracted, the vehicle safety system deploys other safety systems based on the assumption that the occupant of a particular seat is not properly restrained by one or more seat belts.

An alternative embodiment of the vehicle safety system of this invention employs a linear energy-absorbing mechanism to which seat belt webbing is attached. Or a seat belt web may pass over a linear slider mounted in a slider frame so that compression or extension of the linear slider produces additional slack in the webbing. The linear slider is part of, or mounted to an energy-absorbing mechanism. The energy-absorbing mechanism may be for example, a piston that moves against a hydraulic energy loss device; a mechanical plow that deforms the slider frame, or a crushable column. Because the slider acts as an energy dissipating device whenever motion in a particular direction takes place, usually no switch is required to tell the safety system when linear motion is indicating energy dissipation. A sensor is positioned between the slider frame and the slider in order to detect relative motion. The output of the sensor is provided to a vehicle safety system that also receives information from vehicle mounted crash sensors. The vehicle safety system employs system logic which uses output from the slider sensor and the vehicle mounted crash sensors to determine if a crash is taking place and whether a vehicle occupant is or is not properly restrained by one or more seat belts and deploys airbags or other safety systems accordingly.

It is a feature of the present invention to detect proper functioning of a seat belt restraint during an actual crash and to provide that information to a vehicle safety system that controls the deployment of other safety systems such as airbags.

It is another feature of the present invention to provide a vehicle safety system that can detect intentional or accidental misuse of a seat belt during the onset of a vehicle crash.

It is a further feature of the present invention to provide data to a vehicle safety system so that the safety system can adapt to use or non-use of seat belts in restraining a vehicle occupant.

Further features and advantages of the invention will be apparent from the following detailed description when taken in conjunction with the accompanying drawings.

DETAILED DESCRIPTION OF THE INVENTION

Figure 1:
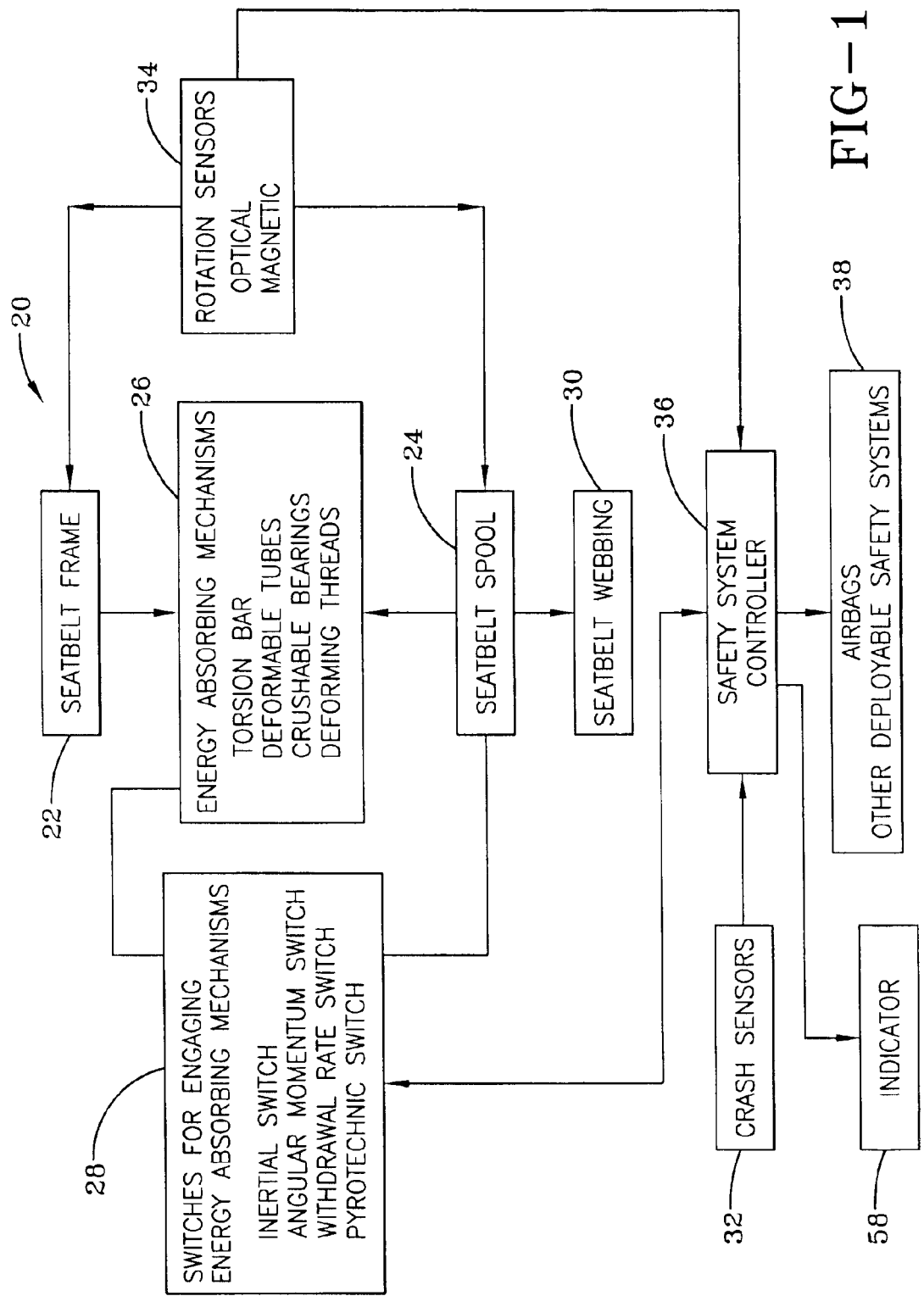
FIG. 1 is a schematic diagram of a vehicle safety system of this invention where an energy-absorbing mechanism is mounted between a seat belt spool and a seat belt frame.
Figure 2:
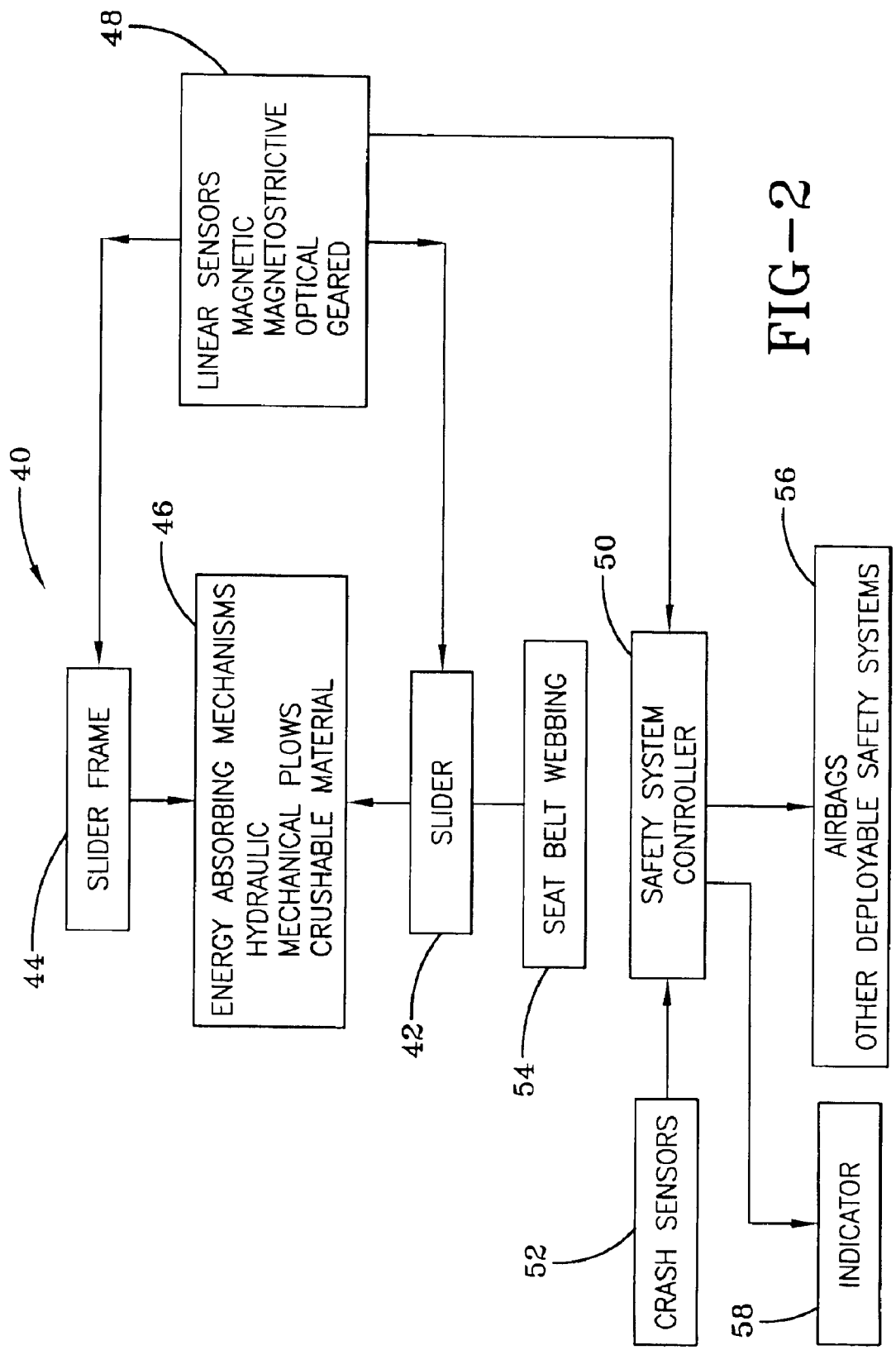
FIG. 2 is a schematic diagram of a vehicle safety system of this invention employing a linear energy-absorbing mechanism.

Referring more particularly to FIGS. 1–2, wherein like numbers refer to similar parts, a vehicle safety system 20 is illustrated schematically in FIG. 1. A seat belt frame 22 rotatably supports a seat belt spool 24. An energy-absorbing mechanism or load limiter 26 such as a torsion bar as illustrated, for example, in U.S. Pat. No. 6,012,667, is positioned between the seat belt frame 22 and the seat belt spool 24. An engagement switch 28 is arranged to connect or lock the energy-absorbing mechanism 26 between the seat belt frame 22 and the seat belt spool 24 upon the occurrence of one or more conditions. The engagement switch 28 is typically an inertial switch, or engagement mechanism, that locks the rotation of the seat belt spool 24 by engaging the energy-absorbing mechanism 26 whenever the vehicle experiences an acceleration above a selected threshold. Alternatively, the seat belt spool may be engaged to the energy dissipation mechanism by an angular momentum switch that responds to the rate at which seat belt webbing 30 is withdrawn from the seat belt spool 24. Another possibility is that a pyrotechnic switch, or engagement mechanism, could be actuated based on the output of a vehicle mounted crash sensor 32.

Once the energy-absorbing mechanism 26 is engaged between the seat belt frame 22 and the seat belt spool 24, any substantial motion of the seat belt spool 24 with respect to the seat belt frame is monitored by a sensor 34 which will typically be mounted on the seat belt frame 22 and which will detect the rotation of the seat belt spool with respect to the seat belt frame 22. A wide range of sensor mechanisms are possible such as, for example, one or more permanent magnets mounted on the seat belt spool could be monitored as they pass a Hall effect sensor, a GMR Sensor, or a magnetic coil. Alternatively, an optical sensor could be used, for example a device similar to an optical shaft encoder. Of course a mechanical linkage between the seat belt spool 24 and the seat belt frame 22 such as a gear train could be used to increase the relative motion of the spool 24 with respect to the frame, to thereby make the motion more rapidly or easily detected.

The vehicle safety system 20 normally has a safety system controller 36 which consists of a micro controller or microprocessor on which software, firmware, or hardwired logic evaluates inputs from other vehicle mounted sensors such as crash sensors 32 and occupant weight sensors (not shown) or occupant position sensors (not shown). Based on safety logic the safety system controller 36 determines if a crash is taking place and if the energy-absorbing mechanism 26 is operating as would be expected if the seat belt webbing 30 were properly positioned to engage in restraining a vehicle occupant. Proper operation of the energy-absorbing mechanism can be determined by the safety system controller based on motion detected by sensors 34 and the knowledge that the seat belt spool is locked by the switch or engagement mechanism 28 to the energy-absorbing mechanism 26. Alternatively, information from the rotation sensors 34 may only be gathered after the crash sensors 32 indicate that vehicle loads are such that the energy-absorbing mechanism 26 must be engaged.

The safety system controller 36, based on safety system logic, considers the status of whether the energy-absorbing mechanism is functioning or not functioning along with the other logic states such as those that characterize the severity of the crash which is occurring, or determine the weight and position of the vehicle occupant; based on these considerations, the controller makes a decision concerning deployment, or deployment mode, of one or more airbags or other safety systems 38. In this way the vehicle safety system 20 can be designed to take into account, to the extent possible, the loading on, misuse, or failure of the seat belt restraint system.

An alternative embodiment vehicle safety system 40 is shown in FIG. 2 which illustrates a seat belt management system employing a linear slider 42 which moves with respect to a slider frame 44 and which incorporates an energy-absorbing mechanism or load limiter 46 which is positioned between the slider 42 and the slider frame 44. A system of this general type is shown in U.S. Pat. No. 6,150,881. The energy-absorbing mechanism 46, which could for example employ a hydraulic, mechanical/crushable, or magnetic fluid resistance mechanism, will normally operate whenever the slider 42 is moved in a particular direction with respect to the slider frame 44. Thus a switch connecting the energy-absorbing mechanism between the slider frame and slider will not normally be necessary. A linear sensor 48 extends between the slider frame and the slider such that the amount of linear motion may be measured. The linear sensor may be an optical, magnetostrictive, or magnetic sensor, or a rotational type sensor that is linked by a gear and track to the slider. The output of the linear sensor 48 is supplied to a safety system controller 50 that receives input from other vehicle mounted sensors such as crash sensors 52. The safety system controller 50 will normally comprise a controller or microprocessor with onboard logic which allows for the implementation of logic which considers whether a crash is taking place and whether the energy-absorbing mechanism 46 is functioning based on the linear sensor 48. With a logic determination of whether a seat belt 54 is properly restraining a vehicle occupant, the optimal deployment of airbags or other safety systems 56 can be determined.

The rotational sensors 34 or liner sensors 48 could supply information that could provide displacement versus time information, which, together with the characteristics of the energy-absorbing mechanisms 26, 46, could be used to determine the loads on the seat belts 30, 54 during a crash. Such information could be used to control the actuation of safety systems, such as the level or speed of airbag deployment, or load information could be used for after crash analysis and correlation with vehicle predicted loads.

The output of the rotary sensors 34 and the linear sensors 48 could, in combination with vehicle crash sensors 32, 52, also be used to provide an indication to the vehicle operator that the energy-absorbing mechanisms require replacement after a vehicle crash by activating an indicator 58. By properly setting required crash sensor limits and the amount of displacement required to be indicated by the rotary or linear sensors, a reliable indication of whether the energy-absorbing mechanism requires replacement could be determined. The indicator 58 could be a dashboard light or simply a change in status of a flag set within the vehicle safety system, the flag being capable of being queried during vehicle repair, or during vehicle startup, and thereby notifying the vehicle operator or repair technician of the need to replace the seat belt energy-absorbing mechanism.

It is understood that the invention is not limited to the particular construction and arrangement of parts herein illustrated and described, but embraces all such modified forms thereof as come within the scope of the following claims.

I claim:

1. A vehicle safety system comprising:
   a safety system controller;
   a seat belt frame;
   a seat belt spool mounted for rotation on the seat belt frame, containing a quantity of seat belt webbing;
   an energy-absorbing mechanism positioned between the seat belt frame and the seat belt spool;
   an engagement mechanism which selectively connects the energy-absorbing mechanism between the seat belt frame and the seat belt spool so that withdrawal of the seat belt webbing from the seat belt spool causes deformation of the energy-absorbing mechanism;
   a motion sensor mounted to the seat belt frame, the sensor operable to detect rotation of the seat belt spool; and
   wherein the safety system controller is in information receiving relation with the motion sensor and in controlling relation with at least one deployable safety system that includes an airbag.

2. The vehicle safety system of claim 1 wherein the safety system controller is in information receiving relation with the engagement mechanism.

3. The vehicle safety system of claim 1 wherein the energy-absorbing mechanism is a torsion bar.

4. The vehicle safety system of claim 1 wherein the vehicle safety system is in information receiving relation with at least one crash sensor.

5. A vehicle safety system comprising:
   a safety system controller;
   a slider frame;
   a slider mounted for motion on the slider frame, and a quantity of seat belt webbing mounted or positioned with respect to the slider so that linear motion of the slider with respect to the slider frame allows extension of the seat belt webbing;
   an energy-absorbing mechanism positioned between the slider and the slider frame, and operable to absorb energy when the slider moves with respect to the slider frame;
   a motion sensor mounted on the slider frame, the sensor operable to detect linear motion of the slider with respect to the frame;
   wherein the safety system controller is in information receiving relation with the motion sensor and in controlling relation with at least one deployable safety system that includes an airbag.

6. The vehicle safety system of claim 5 wherein the vehicle safety system is in information receiving relation with at least one crash sensor.

* * * * *